H. DAFFRON AND C. C. PULLEM.
TROLLEY HEAD.
APPLICATION FILED FEB. 5, 1921.
1,381,807. Patented June 14, 1921.
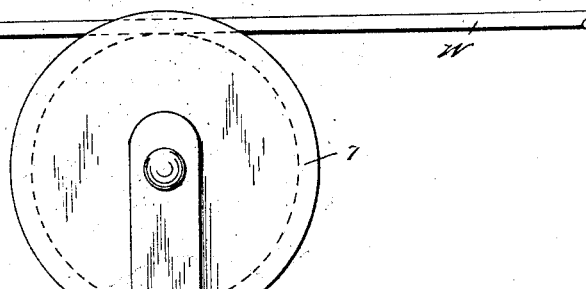
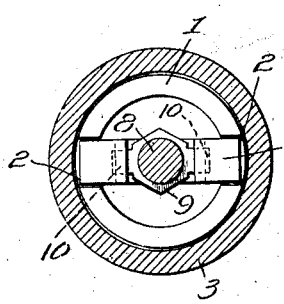
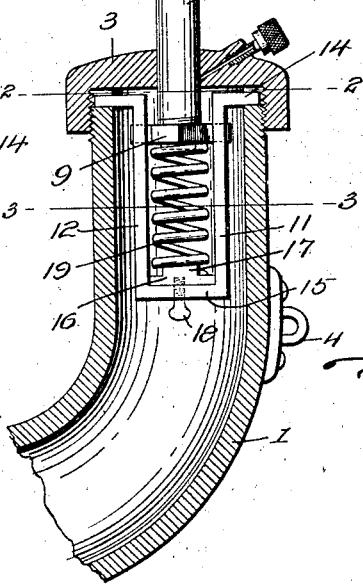
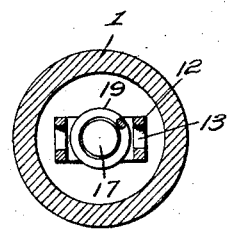
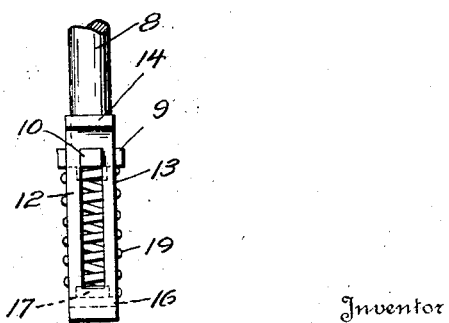
Inventor
Hencel Daffron,
Clyde C. Pullem.
By Geo. P. Kimmel. Attorney

UNITED STATES PATENT OFFICE.

HENCEL DAFFRON AND CLYDE C. PULLEM, OF DETROIT, MICHIGAN.

TROLLEY-HEAD.

1,381,807.  Specification of Letters Patent.  Patented June 14, 1921.

Application filed February 5, 1921. Serial No. 442,745.

*To all whom it may concern:*

Be it known that we, HENCEL DAFFRON and CLYDE C. PULLEM, citizens of the United States, residing at Detroit, in the county of Wayne and State of Michigan, have invented certain new and useful Improvements in Trolley-Heads, of which the following is a specification.

This invention relates to trolleys and more particularly to trolley heads.

The object of the invention is to so construct such a head that the wheel thereof will be yieldably held engaged with the trolley wire and accidental jumping of the wheel from the wire prevented.

Another object is to so construct the head that all of the parts thereof may be assembled ready for use and then inserted in the casing of the trolley pole, the cap of said casing screwed home thereby securing the head in position ready for use.

With these and other objects in view, the invention consists in certain novel features of construction as hereinafter shown and described and specifically pointed out in the claims.

In the accompanying drawing:

Figure 1 represents a side elevation of a trolley head constructed in accordance with this invention shown applied, the casing in which it is mounted being shown in section.

Fig. 2 is a transverse section taken on the line 2—2 of Fig. 1.

Fig. 3 is a similar view taken on the line 3—3 of Fig. 1.

Fig. 4 is a detail side elevation of the lower portion of the trolley head constituting this invention.

In the embodiment illustrated, the head 10 constituting this invention is shown mounted in a casing 1 of a trolley pole, said casing being provided at its upper end at diametrically opposite points with recesses 2 to form seats for the head supporting hanger hereinafter to be described. This casing 1 is closed at its upper end by a cap 3 having threaded engagement therewith and provided with a central opening to receive the shank of the trolley head 5 which constitutes this invention.

This trolley head 5 comprises the usual fork supporting between the furcations 6 the trolley wheel 7. The shank 8 of the fork extends through the central aperture in the cap 3 of the trolley pole casing 1 and carries at its lower end within said casing a plate or nut 9 which is shown threaded on said shank.

This plate 9 is provided with diametrically opposite lugs or arms 10 which are slidably mounted in the side members of a U-shaped hanger 11 which is suspended within the upper end of the casing as is shown clearly in Fig. 1.

This hanger 11 has its side members or legs 12 thereof slotted longitudinally as shown at 13 and provided at their free ends with outturned fingers 14 which are designed to rest in the seat 2 in the upper end of the casing 1 and be held in said seat by the cap 3. The cross bar 15 of the hanger 11 supports a plate 16 equipped with an upstanding boss 17 and held adjustably mounted in the hanger by a set screw 18. A coiled spring 19 is mounted in the hanger 11, one end of which encircles the boss 17 of the plate 16 and the other end engages the inner or lower face of the plate 9 carried by the shank 8. This spring normally projects the trolley fork which operates to hold the wheel or pulley 7 yieldably engaged with the trolley wire W, the spring being of sufficient strength to hold said wheel so engaged against all danger of accidental release and yet permit it to be moved away from the wire when force is applied thereto.

The slotted arms 12 of the hanger provide guides for the lugs 10 of the shank carried plate 9, the outer or upper walls of the slot limiting the forward projection of the shank and the tension of the spring may be adjusted by the set screw 18.

From the above description it will be obvious that by mounting the trolley wheel supporting fork in the hanger 11 with the arms 10 thereof engaged with said hanger to prevent rotation of the fork relatively to the hanger and engaging the arms of said hanger with recesses in the trolley pole casing all possibility of the trolley wheel turning laterally is prevented and yet the shank of said fork will be free to move longitudinally in the casing 1.

The preferred embodiment of the invention is disclosed in the drawings and set forth in the specification, but it will be understood that any modifications within the scope of the claimed invention may be made in the construction without departing from the principle of the invention or sacrificing any of its advantages.

What is claimed is:

1. The combination with a trolley pole having a casing at its upper end, of a trolley wheel supporting fork having its shank mounted for yieldable longitudinal movement in said casing, and coöperating means carried by said casing and shank to hold the latter against lateral movement.

2. The combination with a trolley pole having a casing at its upper end, of a trolley wheel supporting fork having its shank mounted for yieldable longitudinal movement in said casing, a hanger mounted in said casing and held against turning, and means connecting said shank with said hanger to permit the shank to move longitudinally therein and prevent lateral movement thereof, and a coiled spring mounted to normally project said shank to yieldably hold the trolley wheel in engagement with its wire.

3. The combination with a trolley pole having a casing at its upper end, of a trolley wheel supporting fork having its shank mounted for yieldable longitudinal movement in said casing, a substantially U-shaped hanger having outturned fingers at the free ends of the arms thereof, said casing having seats to receive said fingers and hold the hanger against movement in the casing, laterally extending lugs carried by said shank and slidably engaged with the arms of the hanger, and a coiled spring mounted in the hanger to project said shank.

4. The combination with a trolley pole having a casing at its upper end provided at diametrically opposite points in the outer ends thereof with seats, and a closure having a central opening, of a trolley wheel supporting fork having its shank entered through the opening in said closure mounted to slide longitudinally relatively to the casing, a U-shaped hanger having laterally extending fingers to engage the seats of the casing, the arms of said hanger being slotted longitudinally, a plate carried by the inner end of the shank of the trolley fork and having diametrically opposite radially extending lugs projecting through the slots in the arms of said hanger, a coiled spring mounted in said hanger between said plate and the cross bar of the hanger, and means for adjusting the tension of said spring.

In testimony whereof, we affix our signatures hereto.

HENCEL DAFFRON.
CLYDE C. PULLEM.